United States Patent [19]

Huang

[11] Patent Number: 4,727,780

[45] Date of Patent: Mar. 1, 1988

[54] VEHICLE-CARRYING PURPOSE WRENCH

[76] Inventor: Chan S. Huang, 4 Fl., No. 7, Alley 2, Lane 105, Min An Road, Shin Chuang, Taipei, Taiwan

[21] Appl. No.: 900,176

[22] Filed: Aug. 25, 1986

[51] Int. Cl.$^4$ .............................................. B25B 13/00
[52] U.S. Cl. ...................................... 81/54; 81/57.14; 81/63
[58] Field of Search ...................... 81/54, 57.33, 57.14, 81/61, 62, 63; 173/163, 104, 117

[56] References Cited

U.S. PATENT DOCUMENTS 2,728,365 12/1955 Austin ..................................... 81/54

Primary Examiner—Frederick R. Schmidt
Assistant Examiner—Maurina Rachuba
Attorney, Agent, or Firm—Angelo Notaro

[57] ABSTRACT

The vehicle-carrying purpose wrench mainly comprises a housing assembly and a tool assembly wherein the housing assembly further includes a motor casing, a tool casing, a cover and a handle. The tool assembly disposed in the tool casing cooperates with a reversible motor received in the motor casing. By controlling the trigger assembly mounted in the handle, the rotation force can be transmitted to the tool assembly and hence to achieve the purpose of tightening or loosening the screws used for fixing a tire to a vehicle.

1 Claim, 7 Drawing Figures

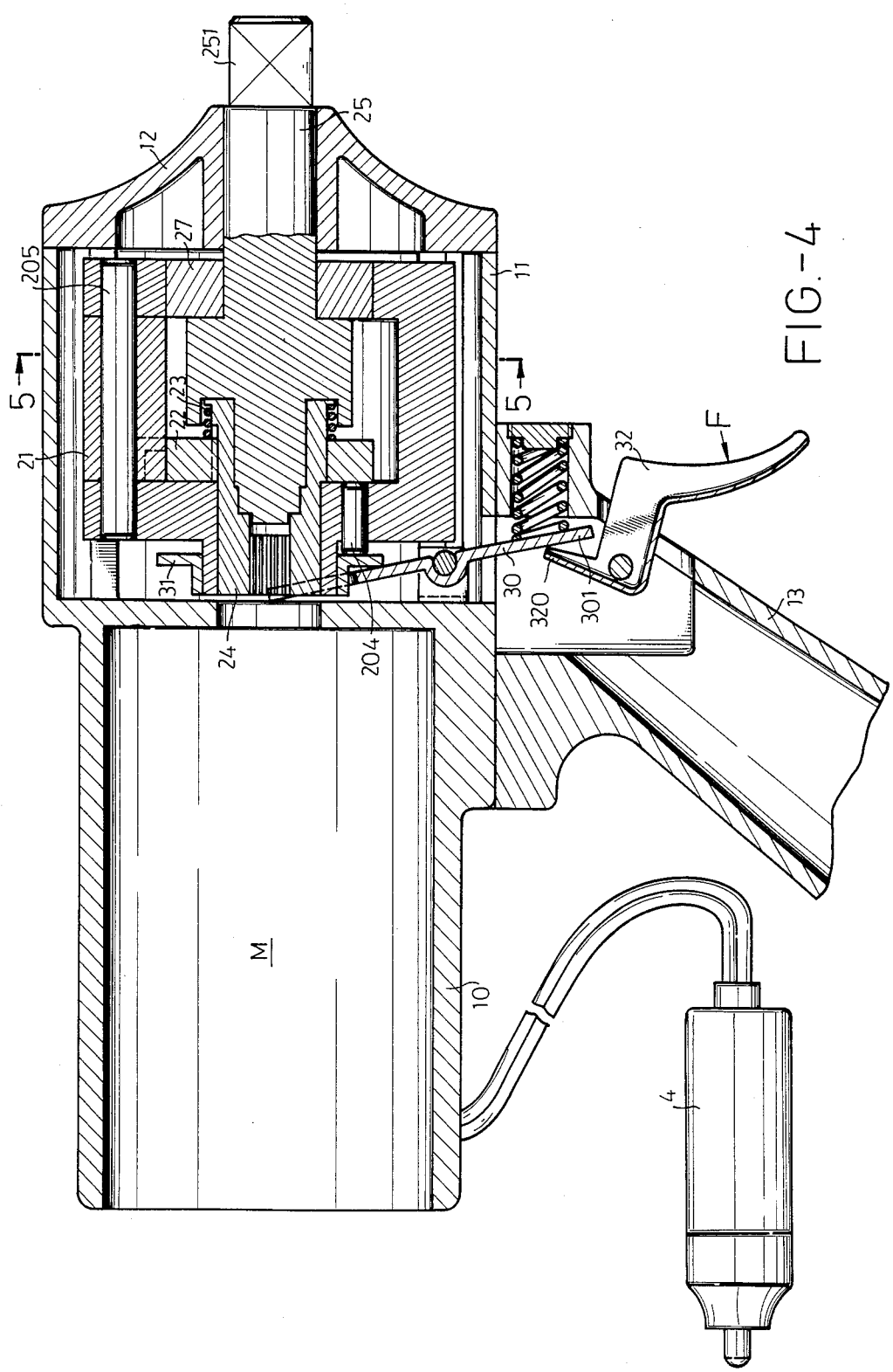

VEHICLE-CARRYING PURPOSE WRENCH

BACKGROUND OF THE INVENTION

This invention relates to a wrench and in particular to one which is easily carried and can take the vehicle electric power as its power source thereby it facilitates the replacement of the wasted tire of a vehicle in any event.

The prior wrenches for replacing the wasted tire generally can be classified into two categories, namely manual type and pneumatic type. The former has to use the man power to loosen the wasted tire from the vehicle or to tighten the new tire to the vehicle. Therefore it is unpractical for use, especially for female driver. The latter, usually being seen in the vehicle maintenance station, utilizes a compressor as the power source to drive a pneumatic wrench for tightening or loosening the screws. However, such equipment is too cumbersome to be carried along with the vehicle thereby it still can not meet the practical requirement for the drivers.

It is, therefore, an object of the present invention to obviate and mitigate the above-mentioned drawbacks.

SUMMARY OF THE INVENTION

It is the primary object of the present invention to provide vehicle-carrying purpose wrench which has a compact form and hence can be carried along with a vehicle for replacing the wasted tire at all events.

It is another object of the present invention to provide a vehicle-carrying purpose wrench which can take the cigarette ligter socket in a vehicle as its electrical power source without the necessity of other power generators.

It is a further object of the present invention to provide a vehicle-carrying purpose wrench which is economical to use.

BRIEF DESCRIPTION OF THE DRAWINGS

FIG. 4 is a partial cross-sectional view thereof showing the prosent invention being in a operation status;

DETAILED DESCRIPTION OF THE PREFERRED EMBODIMENT

Figure 1:
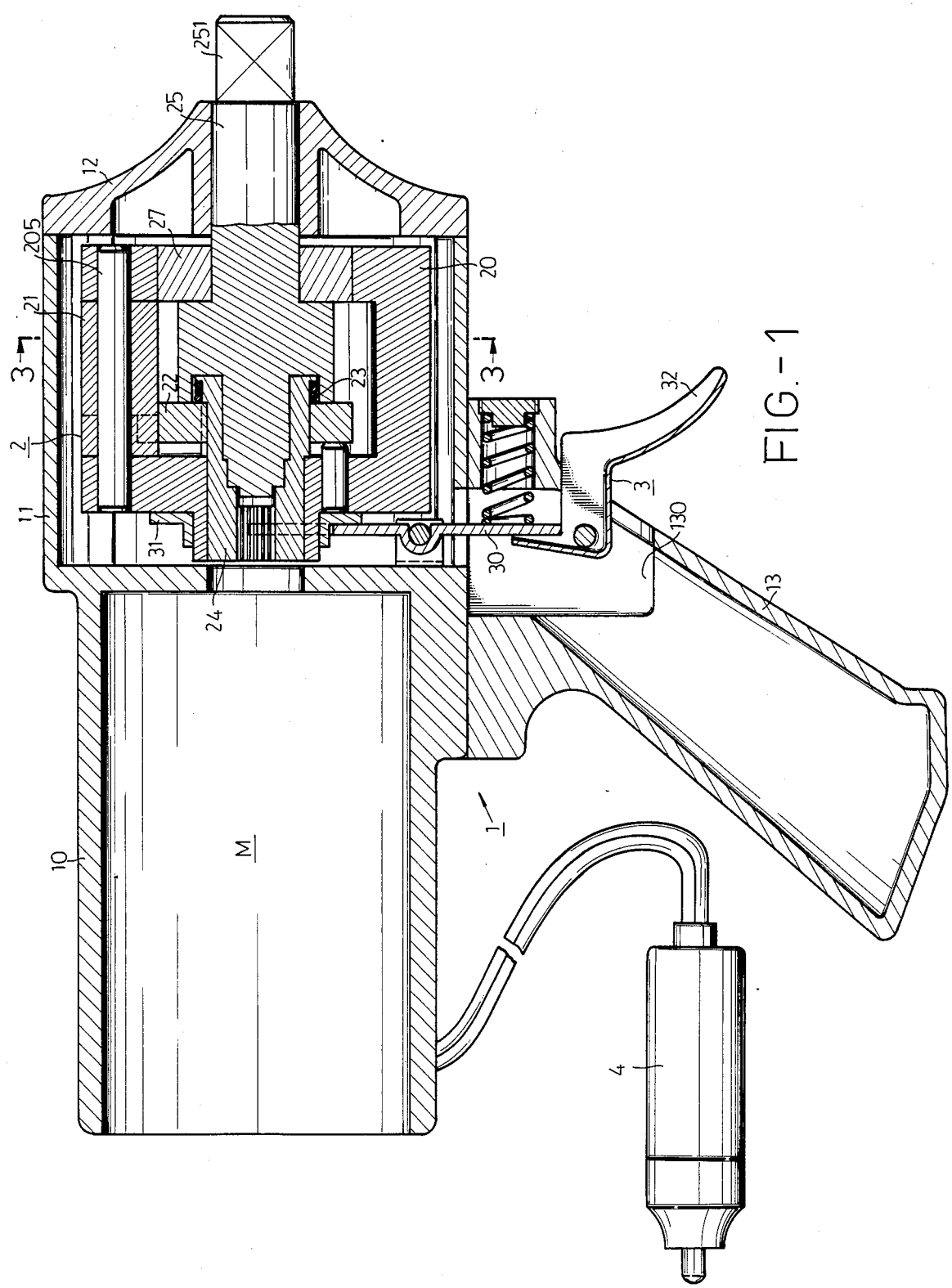
FIG. 1 is a partial cross-sectional view of a preferred embodiment of the present invention.

Referring to the drawings and more particularly to FIG. 1, a preferred embodiment of the present invention mainly comprises a housing assembly (1), a tool assembly (2) and a trigger assembly (3). The housing assembly (1) consists of a a motor casing (10, a tool casing (11), a cover (12) and a handle (13). In the interior of the motor casing (10) is disposed a roversible motor (M) which can be driven to rotate both in forward and reverse directions by the electric power supplied from the cigarette lighter socket of a vehicle. A tool casing (11) connected with the motor casing (10) comprises in its interior a tool assembly (2) which is used to replace the wasted tire of a vehicle. The cover (12) is fixed to one side of the tool casing (11) by means of screws. The handle (13) is disposed below the motor casing (10) and the tool casing (11) for easily grasping the present invention. Further, the handle is formed at its upper portion with a space to receive the trigger assembly (3).

Figure 2:
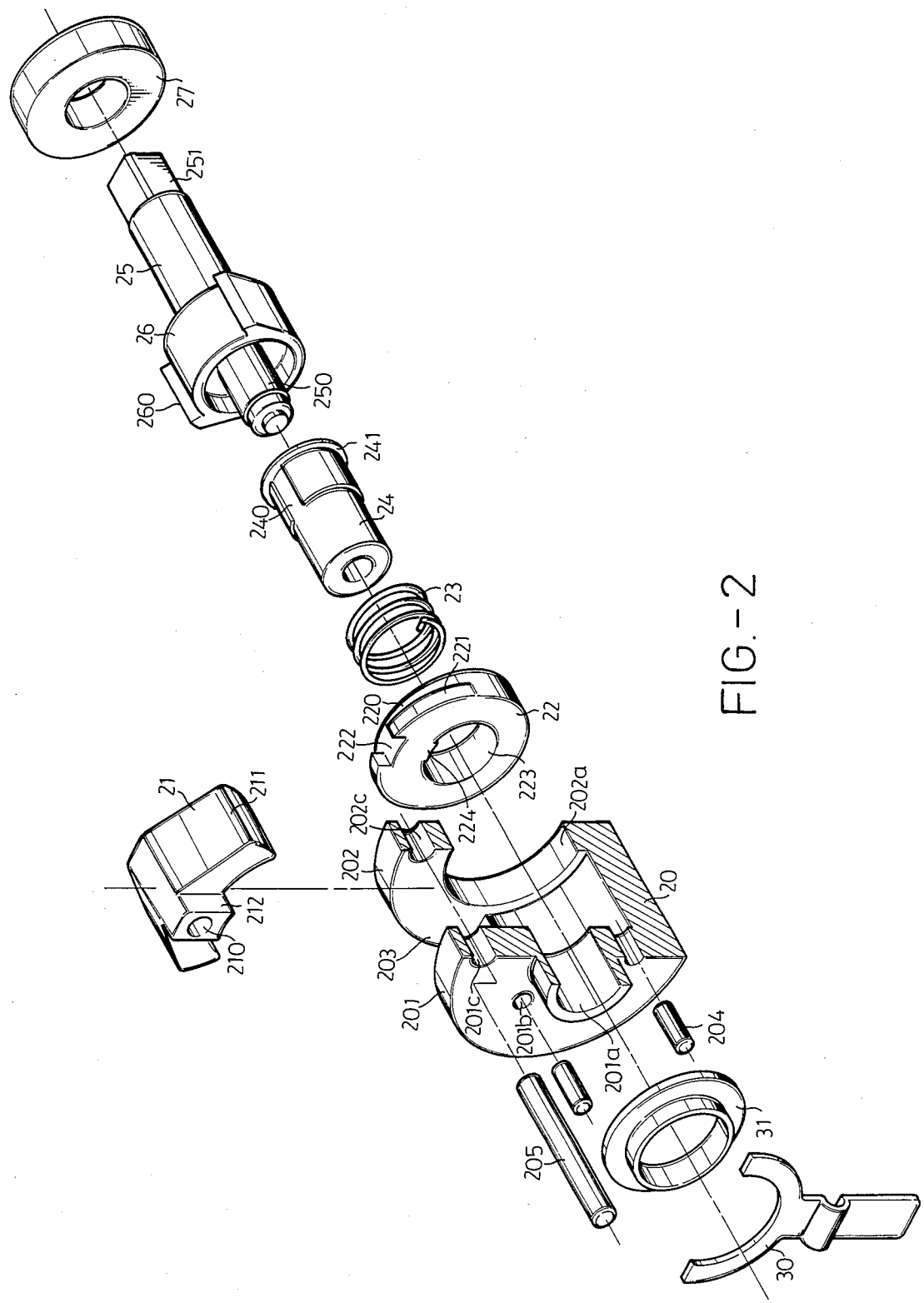
FIG. 2 is a fragmental perspective view of a tool assembly of the present invention.

Referring to FIG. 2, the tool assembly (2) mainly comprises a main body (20), a drive member (21), a transmission member (22), an elastic member (23), a drive shaft (24), a follower shaft (25) a follower member (26). The main body (20) has two parallel side walls (201) and (202) and a recess (203) formed therebetween. The first side wall (201) is provided at the center with an aperture (201a) through which the shaft of the motor can engage with the drive shaft (24). Around the central axis of the aperture (201a) are furnished with three equally spaced pin holes (201b) in which three pins (204) can be respectively located. At the upper portions of the side walls (201) and (202) are properly provided two pin holes (201c) and (202c) in alignment, the inner diameters of which are somewhat larger than the outer diameter of a fixing pin (205). The drive member (21) is rotatably mounted in the recess (203) of the main body (20) by passing the fixing pin (205) through the aperture (210) of the drive member (21) and pin holes (201c) and (202c) of the side walls (201) and (202).

Figure 3:
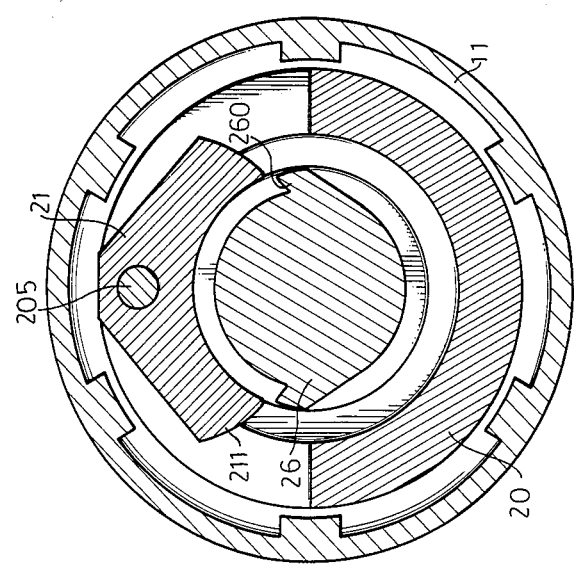
FIG. 3 is a cross-sectional view taken along the line 3—3 of the FIG. 1.
Figure 7:
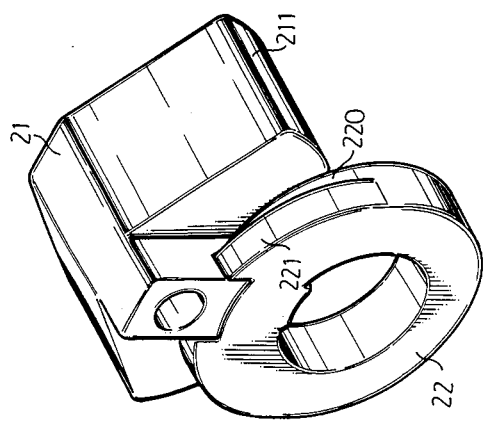
FIG. 7 is a local perspective view illustration the relative position between a drive member and a transmission member when the elastic member being in an unpressed situation.
Figure 6:
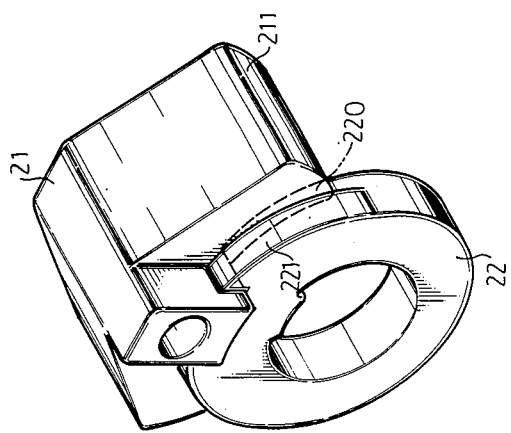
FIG. 6 is a local perspective view illustrating the relative position between a drive member and a transmission member when an elastic member being in a pressed setuation.

The drive member (21) further comprises two wings (211) extending dawnward and an extension (212). Referring to FIG. 3 or 4, the inner surfaces of the wings (211) form an arcuate surface of which the radius of curvature is arranged to correspond to that of the first circumferential section (220) of the transmission member (22). In other words, when the transmission member (22) has been located in the recess (203) of the main body (20), the first circumferential section (220) thereof can slightly contact the inner arcuate surface of the wings (211) of the drive member (21). The transmission member (22) further is provided with a second circumferential section (221) in which a notched slot (222) is formed to correspond to the extention (212) of the drive member (as shown in FIG. 6 or 7). The transmission member (22) is furnished with a central hole (223) having a rectangular key (224) formed thereon so that after the drive shaft (24) having passed through the central hole (223) of the transmission member (22) with the rectangular key slot (240) engaging with the rectangular key (224), the drive shaft (24) together with the transmission member (22) can rotate synchronously. One end of the drive shaft (24) passes through the elastic member (23), the transmission member (22) and the side walls (201) and (202) of the main body (20) to join with the shaft of the motor (M) so as to be capable of being driven to rotate thereby. The other end of the drive shaft (24) having a stop ring (241) to prevent the elastic member (23) from being dropped out thereof can receive the connection end (250) of the follower shaft (25). A follower member (26) which is fixed to the follower shafts (25) is a ring-shaped body having teeth on the circumference thereof to correspond to the wings (211) of the drive mtmber (21). The other end of the follower shaft (25) is a rectangular-shaped body (251) to cooperate with a sleeve for tightening or loosening the screws as replacing wasted tires.

As the elements described hereinbefore are received within the main body (20) by inserting the cover (27) sealingly into the aperture (202a) of the side wall (202) thereof.

Referring to FIG. 1, after those above-mentioned elements have been assembled, a Y-shaped press plate (30) of the trigger assembly (3) is arranged to lean against a stop (31) which in turn tightly contact with the first side wall (201) of the main body (20) to make the pins (204) project inwardly so that the first circucumferential section (220) of the transmission member (22) can slightly contact with the inner arcuate surface of the drive member (21) (FIG. 6) to compress the elastic member (23) as well as to prevent the wings (211) of the drive member (21) from engaging with the teeth (260) of the follower member (26) as shown in FIG. 3. Under such circumstance, even the drive member (21) can be driven to rotate by the motor (M), the follower member (26) still will not be rotated accordingly.

However, as shown in FIG. 4, when the trigger (32) of the trigger assembly (3) is pressed along the arrow F, the upper portion (320) of the trigger (32) will push the lower end (301) of the Y-shaped press plate (30) from its original posetion shown in FIG. 1. Therefore, the compressed elastic member (23) will push the transmission member (22) toward the first side wall (201) of the main body (20) so that, as shown in FIG. 7, the first circumferential section (220) will disengage from the inner arcuate surface of the drive member (21) to make the drive member (21) rotatable about the fixing pin (205) to some extent.

Figure 5:
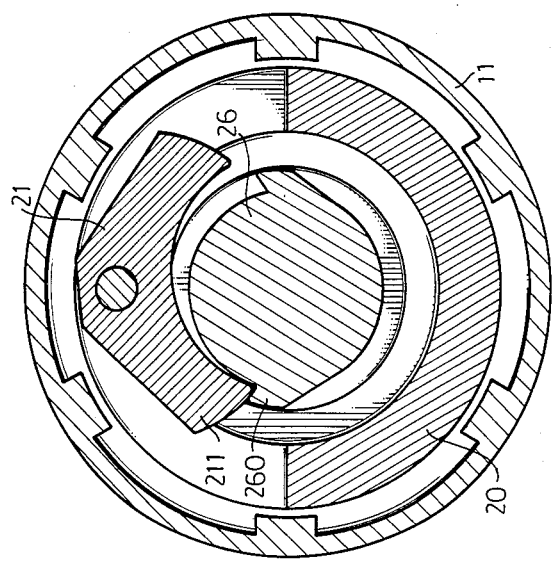
FIG. 5 is a cross-sectional view taken along the line 5—5 of the FIG. 4.

Referring to FIG. 5, when the motor (M) drives the drive shaft (24) together with the transmission member (22) and the main body (20) to rotate synchronously, the drive member (21), owing to the disengagement from the first corcumferential section (220) of the transmission member (22) as well as the effect of the centrifugal force, will rotate in such a manner that one of the two wings (211) of the drive member (21) can engage with one of the teeth (260) of the follower member (26) to drive the follower shaft (25) to rotate accordingly. Then, a sleeve (not shown) connected with the rectangular-shaped body (251) of the follower shaft (25) can be rotated thereby to assemble/disassemble the screws which are used to fix the tire to a vehicle.

Conclusively, the present invention utilizes the vehicle cigarette lighter socket as an electric power source to make a reversible motor combined with a tool assembly in such a manner that the transmission of the rotation force produced by the motor can be controlled by a trigger assembly which can adjust the engagement/disengagement relationship between the wings of the drive member and the teeth of the follower member. Therefore, it indeed has not only the novelty and inventiveness but also the practicability.

What I now claim is:

1. A wrench comprising:
a housing assembly further comprising:
a motor casing;
a tool casing being integrally formed with the motor casing and being located at one side of the motor casing;
a cover being disposed and fixed to one side of the motor casing;
a handle being disposed below the motor casing and the tool casing and being secured thereto, the upper portion of the handle being formed with a space to receive a trigger assembly;
a reversible motor being mounted in the motor casing, said motor being capable of taking the vehicle electrical power as its power source; characterized by
the tool casing comprising a tool assembly;
the tool assembly further comprising:
a main body having a first side wall, a second side wall and a recess formed therebetween, the first side wall being provided at the center with an aperture, around the central axis of the aperture being furnished with a plurality of holes in which a plurality of pins are respectively located, the length of each pin being longer than the thickness of the first side wall, the first side wall having at its upper portion a pin hole, the second side wall having at its upper portion a pin hole which aligns with the pin hole of the first side wall, the second side wall further having a central hole;
a drive member being provided at its center with a hole, the drive member being located in the recess of the main body by passing a fixing pin through the hole of the drive member and the pin holes of the first and second side walls of the main body, the drive member further having two wings extending downward and an extension;
a transmission member being a hollow ring body, said transmission member having a first and a second circumferential sections, the radius of curvature of the first circumferential section being arranged to correspond to that of the inner arcuate surface of the wings of the drive member, the circumferential section being formed with a notched slot to engage with the extension of the drive member, the transmission body being furnished at its center with a rectangular key;
a drive shaft being a hollow cylinder, one end of the drive shaft being connected with the shaft of the motor and the other end thereof being connected with the connection end of a follower shaft, said other end of the drive shaft further being provided with a stop ring and a rectangular key slot which corresponds to the rectangular key of the transmission member;
an elastic member being disposed in the drive shaft and located behind the transmission member, said elastic member being arrangd to lean against the ring stop of the drive shaft to avoid being dropped out of the drive shaft,
a follower shaft passing at one end through the drive shaft and the other end thereof being formed with a rectangular body to correspond to a sleeve which is used to tighten and loosen the screws for fixing a tire to a vehicle;
a follow member being fixed to the follower shaft, the circumference of the follow member being provided with teeth to correspond to the wings of the drive member;
a cover being received within the central hole of the second side wall of the main body;
a trigger assembly comprising:
a trigger being pivotally connected to the lower portion of the space of the handle;
a stop being disposed at the outer wall of the first side wall of the main body; and
a Y-shaped press plate the lower portion of which being arranged to contact with the upper portion of the trigger while the upper portion thereof contacts with the stop, when pressing the trigger in a predetermind manner, the upper portion of the trigger being capable of pushing the lower portion of the Y-shaped press plate to make the Y-shaped press plate displced from its original position.

* * * * *

UNITED STATES PATENT AND TRADEMARK OFFICE
CERTIFICATE OF CORRECTION

PATENT NO. : 4,727,780

DATED : March 1, 1988

INVENTOR(S) : Chan Shu-Hsia Huang

It is certified that error appears in the above-identified patent and that said Letters Patent is hereby corrected as shown below:

On the cover page, change the inventor's name at [76] to read Chan Shu-Hsia Huang.

Signed and Sealed this

Twenty-fifth Day of July, 1989

Attest:

DONALD J. QUIGG

Attesting Officer

Commissioner of Patents and Trademarks